United States Patent Office 3,031,509
Patented Apr. 24, 1962

3,031,509
PREPARATION OF DIALKYL PHOSPHINES
Mervin D. Marshall, Fombell, Pa., and Harold James Harwood, Dayton, Ohio, assignors to Monsanto Chemical Company, St. Louis, Mo., a corporation of Delaware
No Drawing. Filed Aug. 6, 1959, Ser. No. 831,928
4 Claims. (Cl. 260—606.5)

This invention relates to the preparation of organic compounds of phosphorus and more particularly provides a new and valuable method for the preparation of dialkylphosphines.

According to the invention dialkylphosphines are prepared by the reduction of certain tetraalkyl bi(phosphine sulfides) with lithium aluminum hydride, substantially according to the scheme:

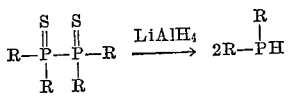

wherein R is an alkyl radical of from 1 to 5 carbon atoms.

The tetraalkyl bi(phosphine sulfides) are readily available by the reaction of an appropriate alkylmagnesium halide with thiophosphoryl chloride, e.g., as described by Reinhardt et al., Chem. Ber. 1656 (1957), and by Kabachnik et al., Izvest. Nauk. S.S.S.R., 56–9 (1949).

In prior art the dialkylphosphines have been obtainable only with difficulty. Thus, according to one method (N. Davidson et al., J. Amer. Chem. Soc. 64, 718 (1942)), a mixture of phosphonium iodide, zinc oxide and an alkyl iodide is heated in a bomb tube to give a mixture of trialkyl- and dialkylphosphines. This procedure involves not only dangerous pressures but also tedious and costly separation of the secondary phosphine from the tertiary phosphine. In another method (U.S. 2,437,795 to Cheves Walling), an alkali metal salt of a primary alkylphosphine is formed by reaction of the latter with alkali metal in liquid ammonia and the salt is reacted with an alkyl iodide. Di-n-butylphosphine is thus reported to be obtained in 33% yield.

The present process provides a method of preparing the dialkylphosphines in improved yields; and isolating difficulties presented when the reaction product is a mixture of secondary, tertiary, and even primary phosphines are not encountered. In the presently provided process the tetraalkyl bi(phosphine sulfides) are merely cleaved during the reduction reaction to give the dialkylphosphines as the only phosphorus compounds.

The tetraalkyl bi(phosphine sulfides) which are presently useful include the tetramethyl, tetraethyl, tetraisopropyl, tetra-n-pentyl and the tetra-tert-pentyl (bi(phosphine sulfide) and compounds in which the alkyl radicals are dissimilar such as P,P'-dimethyl-P,P'-di-n-butyl- or P,P'-diethyl-P,P'-dimethyl bi(phosphine sulfide. Dialkylphosphines obtained by reaction of said tetraalkyl bi(phosphine sulfides) with lithium aluminum hydride according to the invention are, e.g., the dimethyl-, diethyl-, diisopropyl-, di-n-propyl-, di-n-butyl-, diisobutyl-, di-tert-pentyl-, methyl-n-butyl-, or ethylmethylphosphine.

Reaction of the tetraalkyl bi(phosphine sulfides) with the lithium aluminum hydride takes place readily by simply contacting the sulfide with the hydride in the presence of an inert diluent or solvent at ordinary, decreased, or increased temperatures. Preferably, temperatures of from −200° C. to 80° C., depending upon the nature of the sulfide, are used. Stoichiometric quantities of the reactants may be employed, i.e., enough of the hydride is used to provide at least six atoms of hydrogen per mole of the disulfide; but an excess of the hydride over this quantity may be employed. Generally, the reaction is advantageously effected by first mixing the two reactants and then adding the diluent or solvent. However, there may first be prepared a solution or slurry of the hydride in an inert organic liquid, to which solution or slurry the sulfide is gradually introduced, either in the solid state or likewise in solution or suspension.

Inert diluents or solvents which are useful are, e.g., ethyl or isopropyl ether, tetrahydrofuran or the lower dialkyl ethers of the alkylene glycols having a total of from 4 to 12 carbon atoms, e.g., ethylene glycol dimethyl or diethyl ether or propylene glycol dimethyl or dibutyl ether. The less volatile solvents, e.g., the tetrahydrofuran or the alkylene glycol ethers are preferred when preparing the lower dialkylphosphines because the use of such solvents facilitates separation of the highly volatile product. The reaction is preferably conducted in an inert atmosphere, e.g., in nitrogen or argon. When the high-boiling solvents or diluents are used; generally all that is required after completion of the reduction reaction is volatilization of the dialkylphosphines from the reaction mixture. The volatilized product can be further purified, if desired, by low-temperature fractionation.

The invention is further illustrated by, but not limited to, the following example:

Example

To a flask equipped with dropping funnel and pressure tubing leading to a manometer, there were charged 6.15 g. of tetramethyl bi(phosphine sulfide) and 2.9 g. of lithium aluminum hydride. The flask was then swept with nitrogen and about 20 ml. of ethylene glycol dimethyl ether was added dropwise. Introduction of the ether was initiated at room temperature, but owing to a slight constant increase in pressure throughout the system, the flask was ice-cooled while the remainder of the ether was added. When all of the ether had been added the reaction mixture was allowed to attain room temperature and stirred for 3 hours. During addition of the ether and during the stirring period the pressure within the system was occasionally reduced when the manometer which formed part of the system indicated the need. After the 3-hour period, the total volatiles were pumped off through −78.5° C. and −196° C. baths. Purification by repeated fractionation through condensing traps at −78.5° C. to remove the ethylene glycol dimethyl ether and at −111.9° C. to remove a trace of highly volatile material gave a 72.8% yield of dimethylphosphine, having a vapor pressure of 338.0 mm. at 0° C.

When, instead of the tetramethyl bi(phosphine sulfide) used in the above example, there are employed other tetraalkyl bi(phosphine sulfides), e.g., tetraethyl tetra-n-butyl or tetra-n-pentyl bi(phosphine sulfide) there are obtained the corresponding dialkylphosphines, i.e., the corresponding diethyl-, di-n-butyl- or di-n-pentylphosphine.

The dialkylphosphines are very reactive substances. They are easily oxidized to the dialkylphosphinic acids and very easily undergo addition reactions with a wide variety of inorganic and organic compounds. Because of their high reactivity they should be stored in an inert atmosphere.

What we claim is:
1. The method which comprises reacting a tetraalkyl bi(phosphine sulfide) of the formula

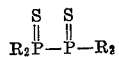

where each R is an alkyl radical of from 1 to 5 carbon atoms, with lithium aluminum hydride in the presence of an inert diluent, and recovering from the resulting reaction product a dialkylphosphine having from 1 to 5 carbon atoms in each alkyl radical.

2. The method which comprises reacting a tetraalkyl bi(phosphine sulfide) of the formula

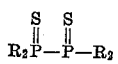

where each R is an alkyl radical of from 1 to 5 carbon atoms, with lithium aluminum hydride in the presence of a diluent which is a dialkyl ether of an alkylene glycol having a total of from 4 to 12 carbon atoms, and recovering from the resulting reaction product a dialkylphosphine having from 1 to 5 carbon atoms in each alkyl radical.

3. The method which comprises reacting tetramethyl bi(phosphine sulfide) with lithium aluminum hydride in the presence of an inert diluent and recovering dimethylphosphine from the resulting reaction product.

4. The method which comprises reacting tetramethyl bi(phosphine sulfide) with lithium aluminum hydride in the presence of the dimethyl ether of ethylene glycol and recovering dimethylphosphine from the resulting reaction product.

References Cited in the file of this patent

Hein et al.: Chemical Abstracts, vol. 51, pages 5619–5620 (1957).

Issleib et al.: Chem. Ber., vol. 92, No. 3, pp. 704–11 (March 12, 1959), abstracteed in Chem. Abs., vol. 53, p. 13990 (Aug. 10, 1959).